United States Patent
Held et al.

(10) Patent No.: US 11,840,180 B2
(45) Date of Patent: Dec. 12, 2023

(54) FASTENING DEVICE FOR A WATER-CATCHING STRIP, AND ARRANGEMENT OF A WATER-CATCHING STRIP ON AN A-PILLAR OF A MOTOR VEHICLE

(71) Applicant: Bayerische Motoren Werke Aktiengesellschaft, Munich (DE)

(72) Inventors: Lukas Held, Munich (DE); Richard Sosnik, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/782,364

(22) PCT Filed: Nov. 10, 2020

(86) PCT No.: PCT/EP2020/081587
§ 371 (c)(1),
(2) Date: Jun. 3, 2022

(87) PCT Pub. No.: WO2021/110372
PCT Pub. Date: Jun. 10, 2021

(65) Prior Publication Data
US 2023/0001866 A1    Jan. 5, 2023

(30) Foreign Application Priority Data
Dec. 6, 2019   (DE) .................. 10 2019 133 413.6

(51) Int. Cl.
*B60R 13/07*   (2006.01)
*F16B 5/12*    (2006.01)

(52) U.S. Cl.
CPC .............. *B60R 13/07* (2013.01); *F16B 5/128* (2013.01)

(58) Field of Classification Search
CPC . B60J 5/0468; B60J 10/70; B60J 10/30; B60J 10/32; B60R 13/06; B60R 13/07; B62D 25/04; F16B 5/128
(Continued)

(56) References Cited

U.S. PATENT DOCUMENTS 4,165,083 A * 8/1979 Dochnahl .............. B60J 10/265
                                                        277/921
4,703,973 A * 11/1987 Fujikawa ................. B60J 10/30
                                                        52/716.6
(Continued)

FOREIGN PATENT DOCUMENTS

DE       3540961 A1    5/1987
DE    296 02 223 U1    5/1997
(Continued)

OTHER PUBLICATIONS

International Search Report (PCT/ISA/210) issued in PCT Application No. PCT/EP2020/081587 dated Jan. 25, 2021 with English translation (five (5) pages).
(Continued)

*Primary Examiner* — Dennis H Pedder
*Assistant Examiner* — Kevin P Weldon
(74) *Attorney, Agent, or Firm* — Crowell & Moring LLP

(57) ABSTRACT

A fastening device is provided for arranging a water-catching strip of a motor vehicle on an A-pillar of the motor vehicle. The fastening device can be secured in its position relative to the A-pillar by way of a bolt fastened to the A-pillar. The fastening device has a retaining region for retaining a fastening portion of the water-catching strip. The fastening device includes, in the retaining region, at least one tab, which protrudes from a main body of the fastening device and has a detent element, which detent element is designed to engage in one of a plurality of grooves. The
(Continued)

grooves are formed in the fastening portion of the water-catching strip such that the grooves are arranged adjacent to each other in a direction of extension of the at least one tab. An arrangement of a water-catching strip of a motor vehicle on an A-pillar is carried out by a fastening device of this type.

13 Claims, 3 Drawing Sheets

(58) Field of Classification Search
USPC .................................... 296/146.15, 93, 213
See application file for complete search history.

(56) References Cited

U.S. PATENT DOCUMENTS

| | | | |
|---|---|---|---|
| 4,840,001 A | | 6/1989 | Kimisawa |
| 4,905,432 A | * | 3/1990 | Romie ..................... B60J 10/70 |
| | | | 52/204.597 |
| 6,030,020 A | * | 2/2000 | Malm ....................... B60J 10/30 |
| | | | 52/204.597 |
| 6,945,592 B1 | * | 9/2005 | Hui ......................... B60R 13/04 |
| | | | 296/210 |
| 9,950,599 B2 | * | 4/2018 | Zunzer .................... B60J 7/022 |
| 11,292,528 B2 | * | 4/2022 | Takahashi ................. B60J 1/10 |
| 2002/0011040 A1 | | 1/2002 | Adachi et al. |
| 2010/0320797 A1 | * | 12/2010 | Schlater ................... B60J 10/70 |
| | | | 296/93 |
| 2014/0265455 A1 | | 9/2014 | Fulton |
| 2017/0225556 A1 | * | 8/2017 | Alhof ...................... B60J 10/75 |

FOREIGN PATENT DOCUMENTS

| | | |
|---|---|---|
| DE | 10 2004 038 901 B3 | 3/2006 |
| DE | 10 2004 060 500 A1 | 7/2006 |
| DE | 10 2006 054 248 A1 | 5/2008 |
| DE | 10 2007 016 667 A1 | 10/2008 |
| DE | 20 2009 017 472 U1 | 4/2010 |
| DE | 10 2012 221 332 A1 | 5/2014 |
| EP | 0 347 485 A1 | 12/1989 |
| GB | 1587631 A * | 4/1981 ............ B60J 10/235 |

OTHER PUBLICATIONS

German-language Written Opinion (PCT/ISA/237) issued in PCT Application No. PCT/EP2020/081587 dated Jan. 25, 2021 (six (6) pages).

German-language Office Action issued in German Application No. 10 2019 133 413.6 dated Oct. 2, 2020 (six (6) pages).

\* cited by examiner

FASTENING DEVICE FOR A WATER-CATCHING STRIP, AND ARRANGEMENT OF A WATER-CATCHING STRIP ON AN A-PILLAR OF A MOTOR VEHICLE

BACKGROUND AND SUMMARY

The invention relates to a fastening device for arranging a water-catching strip of a motor vehicle on an A-pillar of the motor vehicle. The fastening device can be secured in its position relative to the A-pillar by means of a bolt fastened to the A-pillar.

From motor vehicle construction, it is known to fasten a water-catching strip, which extends at the edge of a windshield of the motor vehicle along the A-pillar of the motor vehicle, for example by means of a mounting clip. Here, the mounting clip is fastened by a T bolt, which is welded to the A-pillar. The mounting clip or fastening clip used here is comparatively complicated, since it is made of plastic with a metal inlay. In addition, the fastening clip requires a comparatively large installation space. Furthermore, it is not made possible for this fastening clip to compensate for fabrication tolerances, for example of the water-catching strip.

DE 10 2004 060 500 A1 describes a water-catching strip which is attached to an A-pillar of a motor vehicle and has a sealing lip. The sealing lip bears on a windshield of the motor vehicle. A connection area of the water-catching strip is retained by means of a mounting strip. The mounting strip is in turn connected to the A-pillar by means of bolt-like mounting clips.

Also to be viewed as disadvantageous here is the fact that this type of fastening of the water-catching strip to the A-pillar does not permit tolerances of the water-catching strip to be compensated.

It is an object of the invention to devise a fastening device of the type mentioned at the beginning which permits tolerance compensation, and to provide an arrangement having at least one such fastening device.

According to the invention, this object is achieved by a fastening device and by an arrangement having the features of the independent claims. Advantageous embodiments of the invention are the subject-matter of the dependent patent claims and the description.

A fastening device according to the invention for arranging a water-catching strip of a motor vehicle on an A-pillar of the motor vehicle can be secured in its position relative to the A-pillar by way of a bolt fastened to the A-pillar. The fastening device comprises a retaining region for retaining a fastening portion of the water-catching strip. In the retaining region, the fastening device has at least one tab, which protrudes from a main body of the fastening device and has a detent element which is designed to engage in one of a plurality of grooves. The grooves are formed in the fastening portion of the water-catching strip such that they are arranged adjacent to each other in the direction of extension of the at least one tab.

When fastening the fastening portion of the water-catching strip to the retaining region of the fastening device, the detent element of the at least one tab can thus engage in one of the grooves, which are arranged adjacent to each other in the direction of extension of the tab or are formed so as to follow one another in the fastening section of the water-catching strip. In the direction of extension of the at least one tab, the water-catching strip can thus be fastened displaceably in the retaining region of the fastening device in discrete stages, depending on the one of the grooves in which the latching element of the at least one tab engages. Consequently, the fastening device permits tolerance compensation during the mounting of the water-catching strip.

Accordingly, in particular fabrication tolerances and/or mounting tolerances of the water-catching strip during the arrangement of the water-catching strip on the A-pillar by means of the fastening device can be compensated for by the fastening device.

In particular, tolerance compensation is also possible at right angles to the direction of extension of the at least one tab, for example by the water-catching strip being displaced along the grooves relative to the detent element engaging in one of the grooves. The fastening device therefore preferably permits both tolerance compensation in a longitudinal direction of the water-catching strip, which corresponds to a longitudinal direction of the A-pillar, and also at right angles to the longitudinal direction of the water-catching strip or relative to an installed position of the fastening device substantially at right angles to a windshield of the motor vehicle, on the edge of which the water-catching strip is arranged.

Preferably, the at least one tab and at least one web protruding from the main body in the direction of extension of the tab laterally delimit an insertion region of the fastening device. The fastening portion of the water-catching strip can be inserted into the insertion region in the direction opposite to the insertion direction of the tab. As a result of arranging the at least one web and the at least one tab on mutually opposite sides of the insertion region, good guidance is provided during the insertion of the fastening portion of the water-catching strip into the insertion region. Consequently, the attachment of the water-catching strip to the fastening device is particularly process-reliable.

Preferably, in a first portion of the insertion region, a first web and two tabs are arranged on mutually opposite sides of the insertion region, wherein, in a second portion of the insertion region, a second web and two further tabs are arranged on mutually opposite sides of the insertion region. As a result of providing a plurality of webs and a plurality of tabs in the two portions of the insertion region, particularly secure guidance of the water-catching strip during its fastening to the A-pillar by means of the retaining region of the fastening device can be achieved.

Preferably, along the main body, the first web is arranged to be offset relative to the two tabs of the first portion, the second web being arranged to be offset to the two further tabs of the second portion along the main body. In this way, with a comparatively low use of material for the provision of the webs and the tabs, secure retention of the fastening portion of the water-catching strip in the insertion region of the fastening device can be ensured.

This applies, particularly, if the first web is arranged along the main body opposite a gap between the two further tabs and the second web is arranged along the main body opposite a gap between the two further tabs.

Preferably, the fastening device has a receiving opening for receiving a sub-region of the bolt. For example, the bolt can be designed as a T bolt and the receiving opening to receive a head or a shaft of the T bolt. As a result of receiving the sub-region of the bolt in the receiving opening in the fastening device, particularly good securing of the position of the fastening device on the A-pillar can be implemented.

Preferably, the receiving opening is arranged along the main body between the first portion of the insertion region and the second portion of the insertion region. In this way, in the installed position, the fastening device is fixed relative to the A-pillar in a central region of the main body by means of the bolt fastened to the A-pillar. Forces which occur as the fastening portion is inserted into the retaining region comprising sections of the insertion region can thus be absorbed particularly well by the fastening device.

Preferably, a wall of the main body that delimits the receiving opening has a plurality of ribs. By means of such a wavy profile of the wall of the main body that delimits the receiving opening, the fastening device can be plugged simply and easily onto the bolt even if the bolt is, for example, afflicted by weld splatter or deviations from intended dimensions of the bolt for any other reason.

Preferably, in the region of the receiving opening, the fastening device has a detent web which is designed to latch a sub-region of the bolt. As a result, an individual dealing with the mounting of the fastening device on the A-pillar can be given feedback, in particular haptic and/or acoustic feedback, that with the latching of the sub-region of the bolt on the detent web, the fastening device has reached its installed position. Consequently, the mounting of the fastening device on the A-pillar can be configured particularly process-reliably.

Preferably, the detent element of the at least one tab projects away from the at least one tab in the direction of a width of the fastening device. In this way, it is possible to achieve engagement of the detent element in one of the grooves which are formed in the fastening portion of the water-catching strip, securing the water-catching strip particularly well.

Preferably, the width of the fastening device is less than 7 mm, in particular about 6 mm. As a result, the fastening device requires particularly little installation space, and comparatively little material is sufficient to provide the fastening device.

It has been shown to be further advantageous if the fastening device is made of plastic. This makes the provision and fabrication of the fastening device particularly simple and economical. For example, the entire fastening device can be formed from a plastic such as polyoxymethylene (POM).

Preferably, the fastening device has at least one spring piece projecting from the main body in the direction of extension of the at least one tab. The at least one spring piece is designed to bear on the A-pillar under preload in an installed position of the fastening device. In this way, the at least one spring piece ensures defined positioning of the fastening device in the installed position of the fastening device.

Finally, it has been shown to be advantageous if the fastening device has at least one protective tab. In an installed position of the fastening device, the protective tab is arranged between a supporting part of the water-catching strip and a surface of the A-pillar. Consequently, the protective tab ensures that the supporting part of the water-catching strip does not come directly into contact with the surface of the A-pillar. In this way, damage, for example to paintwork of the A-pillar, by the water-catching strip can be prevented simply and reliably.

An arrangement according to the invention of a water-catching strip of a motor vehicle on an A-pillar of the motor vehicle is achieved by means of at least one fastening device according to the invention. Here, the fastening portion of the water-catching strip is retained in the retaining region of the fastening device, and the detent element of the at least one tab engages in one of the grooves which are arranged adjacent to each other in the direction of extension of the at least one tab in the fastening portion of the water-catching strip. The arrangement makes it possible, for example, to compensate for fabrication tolerances of the water-catching strip and/or the A-pillar in a simple way. This is because the fastening portion of the water-catching strip can be fastened in the retaining region on the fastening device in such a way that the detent element of the at least one tab engages in a suitable groove.

Preferably, a respective length of the grooves is greater than a length of an engagement region in which the detent element engages in one of the grooves. This results in the possibility of compensating for tolerances in a longitudinal direction of extension of the water-catching strip, which corresponds to a longitudinal direction of the extension of the A-pillar, as the water-catching strip is mounted. Because the detent element can be brought into engagement with one of the grooves at a respectively desired position.

The advantages and preferred embodiments described for the fastening device according to the invention also apply to the arrangement according to the invention and vice versa.

Further features of the invention emerge from the claims, the figures and the figure description. The features and feature combinations mentioned above in the description and the features and feature combinations mentioned below in the figure description and/or shown on their own in the figures can be used not only in the respectively specified combination but also in other combinations or on their own.

The invention will now be explained in more detail by using a preferred exemplary embodiment and with reference to the drawings.

DETAILED DESCRIPTION OF THE DRAWINGS

Figure 1:
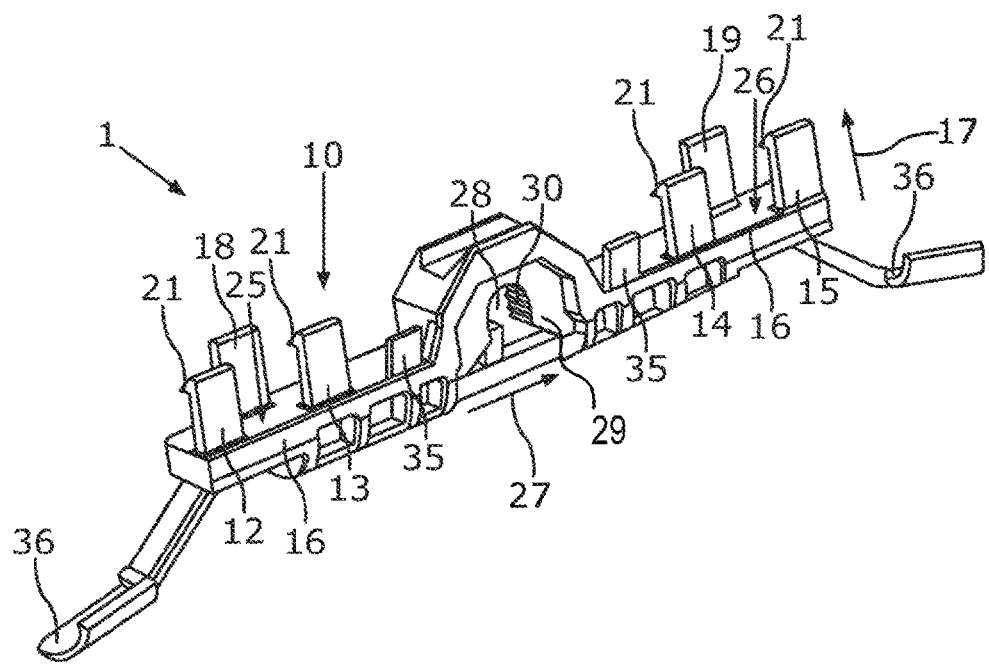
FIG. 1 is a schematic perspective view of a fastening device for fastening a water-catching strip to an A-pillar of a motor vehicle.
Figure 4:
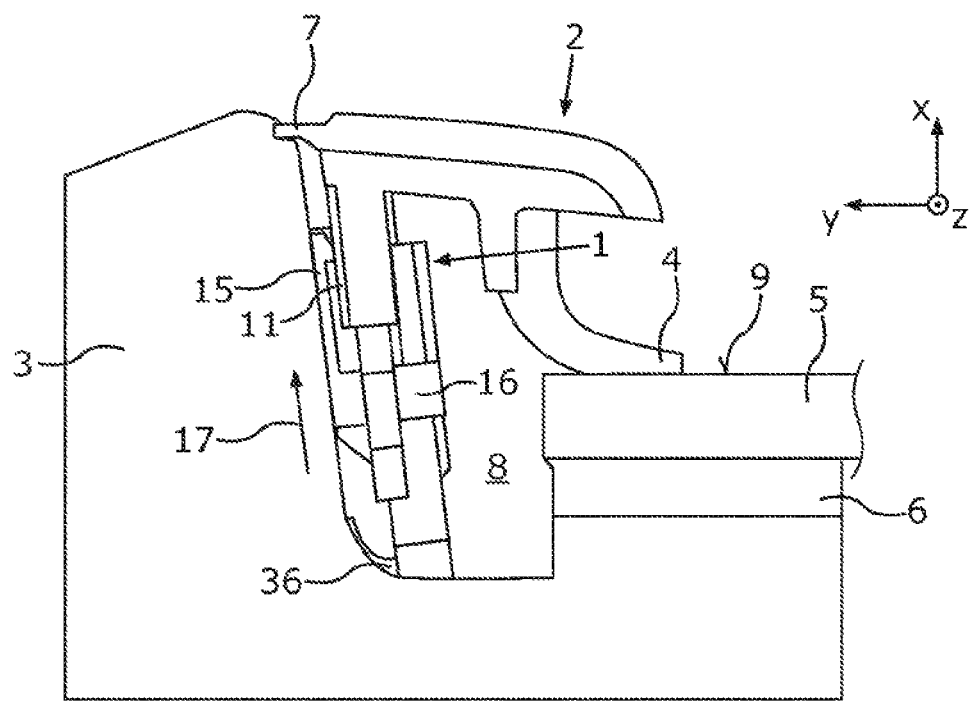
FIG. 4 shows the fastening device, by which the water-catching strip is retained on the A-pillar, fastened to the A-pillar.

FIG. 1 shows a schematic perspective view of a fastening device 1 or a fastening clip which is used to fasten a water-catching strip 2 to an A-pillar 3 of a motor vehicle (cf. FIG. 4).

In FIG. 4, the fastening device 1 is shown in an installed position, in which the fastening device 1 is fastened to a bolt (not shown), which is welded to the A-pillar 3. According to FIG. 4, the water-catching strip 2 has a first sealing lip 4, which bears on a front side 9 of a windshield 5 of the motor vehicle. The windshield 5 can be fastened to the A-pillar 3 by means of a window adhesive 6. According to FIG. 4, a further sealing lip 7 of the water-catching strip 2 bears on the A-pillar 3. The water-catching strip 2 is used as far as possible to prevent water which is conveyed along the windshield 5 to the first sealing lip 4 of the water-catching strip 2 by way of a windshield wiper (not shown) from being applied to a side window of the motor vehicle (not shown).

The water-catching strip 2 is thus used as far as possible in particular to avoid soiling of the side window of the motor vehicle.

The windshield 5 extends substantially in the direction of the vehicle vertical axis z and the vehicle transverse axis y of the motor vehicle, which are illustrated in FIG. 4. Accordingly, according to FIG. 4 the fastening device 1 is received in the region of a recess 8 formed in the A-pillar 3, from which a sub-region is set back in the direction of the vehicle longitudinal axis x with respect to the front side 9 of the windshield 5. Because of the usually provided inclination of the windshield 5 and of the A-pillar 3, the water-catching strip 2 also does not extend strictly along the vehicle vertical axis z but is accordingly inclined with respect to a plane spanned by the vehicle longitudinal axis x and the vehicle transverse axis y. Nevertheless, for simplification in the explanation of the fastening device 1, reference will be made to these aforementioned axes below.

The fastening device 1 in the present case permits tolerance compensation of the water-catching strip 2 both along the A-pillar 3 and, correspondingly, substantially in the direction of the vehicle vertical axis z and also at right angles to the windshield 5 and thus substantially in the direction of the vehicle longitudinal axis x. This is to be explained in more detail with reference to the further figures.

Figure 5:
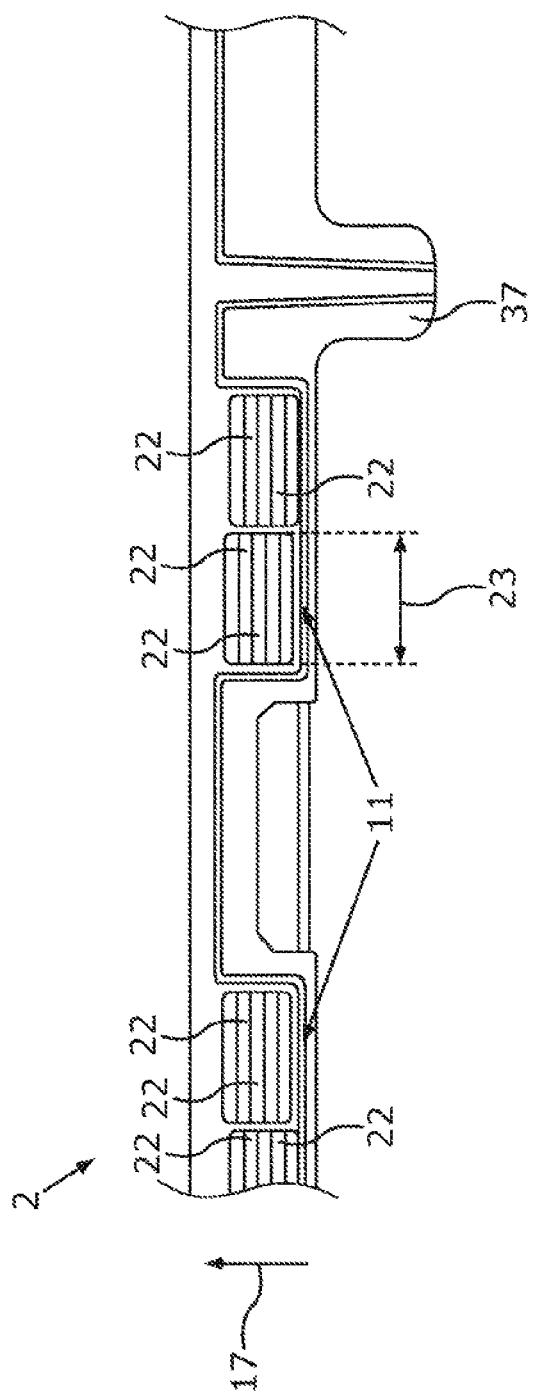
FIG. 5 shows the water-catching strip according to FIG. 4 in part and in a schematic top view.

The fastening device 1 has a retaining region 10 for retaining a fastening portion 11 of the water-catching strip 2 (cf. FIG. 1 in conjunction with FIG. 5). In the retaining region 10, the fastening device 1 has tabs 12, 13, 14, 15. The respective tabs 12, 13, 14, 15 project from a main body 16 of the fastening device 1 in a direction of extension 17 which, in FIG. 1, is illustrated by an arrow. In the installed position of the fastening device 1, in which the fastening device 1 is fastened to the A-pillar 3, the tabs 12, 13, 14, 15 thus extend substantially in the direction of the vehicle longitudinal axis x.

Figure 3:
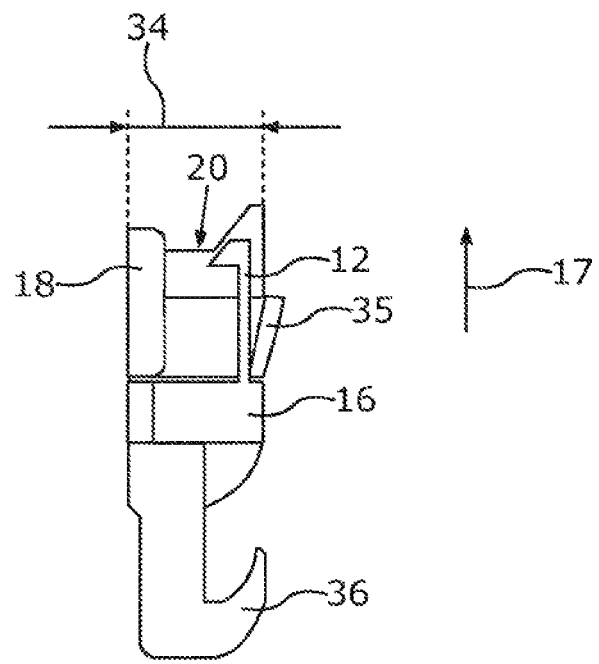
FIG. 3 is a view of a narrow side of the fastening device according to FIG. 1, wherein a width of the fastening device is visible from the view of the narrow side.

As mating pieces to the tabs 12, 13, 14, 15, the fastening device 1 has respective webs 18, 19 which, in the retaining region 10, project away from the main body 16 in the direction of extension 17, just like the tabs 12, 13, 14, 15. In this regard, it can be seen from FIG. 3 that the webs 18, 19 and the tabs 12, 13, 14, 15 delimit an insertion region 20 of the fastening device 1 laterally. The fastening portion 11 of the water-catching strip 2 can be inserted into this insertion region 20 counter to the direction of extension 17 of the tabs 12, 13, 14, 15, in order to fix the water-catching strip 2 to the A-pillar 3 by means of the fastening device 1.

It can be seen from FIG. 1 that the respective tabs 12, 13, 14, 15 have detent elements in the form of respective detent lugs 21. The detent lugs 21 can be brought into engagement with grooves 22 which are formed in the fastening portion 11 of the water-catching strip 2 (cf. FIG. 5).

As seen in the direction of extension 17 of the lugs 12, 13, 14, 15, which in FIG. 5 is likewise illustrated by an arrow for clarification, the grooves 22 are arranged adjacent to each other in the fastening portion 11 of the water-catching strip 2. In other words, the grooves 22 are arranged to follow one another in the fastening portion 11 in the direction of extension 17. In the present case, the grooves 22 offset relative to one another in the direction of extension 17 are formed as keyways. Depending on the extent to which the fastening portion 11 of the water-catching strip 2 is pushed into the insertion region 20 of the fastening device 1, the detent lugs 21 thus engage in different grooves 22. Accordingly, tolerance compensation of the water-catching strip 2 in the direction of extension 17 of the tabs 12, 13, 14, 15, and thus approximately in the direction of the vehicle longitudinal axis x, is provided.

Figure 2:
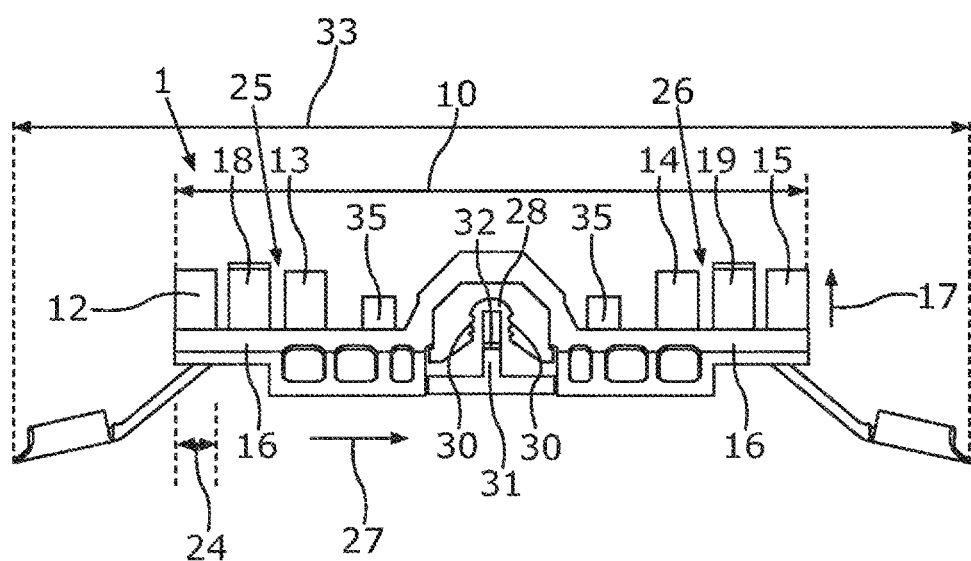
FIG. 2 is a side view of the fastening device according to FIG. 1.

Furthermore, a length 23 of the grooves 22 in the direction of the longitudinal extension of the water-catching strip 2, that is to say along the A-pillar 3, is greater than a width 24 of the respective tabs 12, 13, 14, 15 (cf. FIG. 2 in conjunction with FIG. 5). Accordingly, the respective length 23 of the grooves 22 is greater than a length of an engagement region in which the detent lugs 21 engage in the grooves 22. As a result, it is also possible to arrange the water-catching strip 2 at different positions in the direction of the longitudinal extension of the A-pillar 3, and thus substantially in the direction of the vehicle vertical axis z. Consequently, tolerance compensation of the water-catching strip 2 in the direction of the longitudinal extension of the water-catching strip 2 is also made possible.

In a first portion 25 of the insertion region 20, the two tabs 12, 13 and the first web 18 are arranged on mutually opposite sides of the insertion region 20. In a second portion 26 of the insertion region 20, the second web 19 and the two further tabs 14, 15 are arranged in an analogous way on the mutually opposite sides of the insertion region 20. The retaining region 10 of the fastening device 1 in the present case comprises the two portions 25, 26 of the insertion region 20.

It can be seen in particular from FIG. 2 that along the main body 16, and thus in the longitudinal direction 27 of the fastening device 1, which is illustrated by an arrow in FIG. 1, the first web 18 is arranged opposite a gap between the two tabs 12, 13, and the second web 19 is arranged opposite a gap between the two further tabs 14, 15.

The tabs 12, 13, 14, 15 formed in the manner of hook lugs and having the detent lugs 21, in cooperation with the webs 18, 19 serving as mating pieces, ensure the fastening of the water-catching strip 2 on the fastening device 1 in the retaining region 10.

Between the two portions 25, 26 of the insertion region 20, the fastening device 1 has a receiving opening 28, which is used to receive, for example, a shaft of the bolt (not shown) in the present case welded to the A-pillar 3. A wall 29 of the main body 16 that delimits the receiving opening 28 has a plurality of ribs 30, of which, for clarity, only one is provided with a designation (cf. FIG. 1). Because of this wavy profile of the wall 29 of the receiving opening 28, the fastening device 1 can be fixed to the bolt, in particular formed as a T bolt, or plugged onto the bolt even if the bolt is afflicted by weld spatter or the like.

The receiving opening 28 in the present case is configured in such a way that the fastening device 1 is secured in its position after being pushed onto the bolt. In this regard, it can be seen in particular from FIG. 2 that the fastening device 1 has a detent web 31 in the region of the receiving opening 28, which detent web 31 is used to secure the T bolt received in the receiving opening 28. In particular, the detent web 31 can have a stop 32, on which a head of the T bolt (not shown) bears when the shaft of the T bolt is received in the receiving opening 28 and the ribs 30 bear on the shaft of the T bolt.

The fastening clip or the fastening device 1, formed of plastic in the present case, can have a length 33 in the longitudinal direction 27 which is, for example, about 90 mm (cf. FIG. 2). Accordingly, a width 34 of the fastening device 1 (cf. FIG. 3) at right angles to the direction of extension 17 and at right angles to the longitudinal direction 27 is preferably about 6 mm. As a result, the fastening device 1 requires comparatively little overall space in the direction toward the windshield 5 in the depression 8 (cf. FIG. 4).

Preferably, the water-catching strip 2 is formed as a two-component injection molding, which has a soft component, for example in the form of a thermoplastic elastomer (TPE) and a hard component. The hard component can be formed, for example, from polypropylene (PP), in particular as polypropylene reinforced by glass fibers (PP-GF). For instance, the glass fiber proportion can be 30% of the hard component.

Preferably, the grooves 22, formed as keyways in the present case, are arranged in the area of the water-catching strip 2 in which the water-catching strip 2 is formed of the hard component. In other words, the fastening portion 11 of the water-catching strip 2 is preferably formed as a hard component.

In the present case, the hook lugs attached to one side, that is to say the tabs 12, 13, 14, 15 having the respective detent lugs 21, in cooperation with the opposite mating pieces or webs 18, 19, ensure the firm retention of the water-catching strip 2 when the fastening portion 11 of the water-catching strip 2 is inserted into the insertion region 20 and is thus fixed in the retaining region 10 of the fastening device 1.

It can further be seen in particular from FIG. 1 and FIG. 2 that the fastening device 1 has two spring pieces 35 in the present case, which bear on the A-pillar 3 under preload in the installed position of the fastening device 1. These spring pieces 35 thus ensure a defined position of the fastening device 1 on the A-pillar 3.

Furthermore, the fastening device in the present case has two protective tabs 36 which project from respective ends of the main body 16 in the longitudinal direction 27 of the fastening device 1. The protective tabs 36 are used to prevent direct contact of supporting parts 37 of the water-catching strip 2 (cf. FIG. 5) with a surface of the A-pillar 3. If, therefore, the water-catching strip 2 is fastened to the A-pillar 3 by means of the at least one fastening device 1, the supporting parts 37 of the water-catching strip 2 possibly bear on the protective tabs 36. However, the supporting parts 37 do not touch the usually painted surface of the A-pillar 3.

Overall, the examples show how a plastic clip fastening for welded T bolts with tolerance compensation for the water-catching strip 2 can be provided by means of the invention.

LIST OF DESIGNATIONS

1 Fastening device
2 Water-catching strip
3 A-pillar
4 Sealing lip
5 Windshield
6 Window adhesive
7 Sealing lip
8 Recess
9 Front side
10 Retaining region
11 Fastening portion
12 Tab
13 Tab
14 Tab
15 Tab
16 Main body
17 Direction of extension
18 Web
19 Web
20 Insertion region
21 Detent lug
22 Groove
23 Length
24 Width
25 Portion
26 Portion
27 Longitudinal direction
28 Receiving opening
29 Wall
30 Rib
31 Detent web
32 Stop
33 Length
34 Width
35 Spring piece
36 Protective tab
37 Supporting part
x Vehicle longitudinal axis
y Vehicle transverse axis
z Vehicle vertical axis

What is claimed is:

1. A fastening device for arranging a water-catching strip on an A-pillar of a motor vehicle, the A-pillar having a bolt fastened thereto to secure the fastening device in position relative to the A-pillar, comprising:
a main body of the fastening device;
a retaining region of the fastening device that retains a fastening portion of the water-catching strip, wherein
the fastening device, in the retaining region, has at least one tab projecting from the main body, the at least one tab includes a detent element, which is configured to engage in one of a plurality of grooves which are formed in the fastening portion of the water-catching strip such that the plurality of grooves are arranged adjacent to each other in a direction of extension of the at least one tab,
the fastening device has at least one spring piece projecting from the main body in the direction of extension of the at least one tab, which spring piece is configured to bear on the A-pillar under preload in an installed position of the fastening device.

2. The fastening device according to claim 1, wherein the at least one tab and at least one web projecting from the main body in the direction of extension of the tab laterally delimit an insertion region of the fastening device, into which insertion region the fastening portion of the water-catching strip is insertable in a direction opposite to the direction of extension.

3. The fastening device according to claim 2, wherein
in a first portion of the insertion region, a first web and two tabs are arranged on mutually opposite sides of the insertion region, and
in a second portion of the insertion region, a second web and two further tabs are arranged on the mutually opposite sides of the insertion region.

4. The fastening device according to claim 3, wherein along the main body, the first web is arranged to be offset to the two tabs of the first portion, and the second web is arranged to be offset to the two further tabs of the second portion along the main body.

5. The fastening device according to claim 4, wherein
the first web is arranged along the main body opposite a gap between the two tabs, and
the second web is arranged along the main body opposite a gap between the two further tabs.

6. The fastening device according to claim 1, wherein the fastening device has a receiving opening configured to receive a sub-region of the bolt.

7. The fastening device according to claim 3, wherein
the fastening device has a receiving opening configured to receive a sub-region of the bolt, and
the receiving opening is arranged along the main body between the first portion of the insertion region and the second portion of the insertion region.

8. The fastening device according to claim 6, wherein a wall of the main body that delimits the receiving opening has a plurality of ribs.

9. The fastening device according to claim 6, wherein in the region of the receiving opening, the fastening device has a detent web, which is configured to latch a sub-region of the bolt.

10. The fastening device according to claim 1, wherein the detent element of the at least one tab projects away from the at least one tab in a direction of a width of the fastening device, wherein the width of the fastening device is less than 7 mm.

11. The fastening device according to claim 1, wherein the fastening device is a plastic fastening device.

12. A fastening device for arranging a water-catching strip on an A-pillar of a motor vehicle, the A-pillar having a bolt fastened thereto to secure the fastening device in position relative to the A-pillar, comprising:
a main body of the fastening device;
a retaining region of the fastening device that retains a fastening portion of the water-catching strip, wherein
the fastening device, in the retaining region, has at least one tab projecting from the main body, the at least one tab includes a detent element, which is configured to engage in one of a plurality of grooves which are formed in the fastening portion of the water-catching strip such that the plurality of grooves are arranged adjacent to each other in a direction of extension of the at least one tab,
the fastening device has at least one protective tab which, in an installed position of the fastening device, is arranged between a supporting part of the water-catching strip and a surface of the A-pillar.

13. An arrangement, comprising:
a water-catching strip of a motor vehicle configured for an A-pillar of the motor vehicle;
at least one fastening device, the at least one fastening device comprising:
a main body;
a retaining region, wherein
the fastening device, in the retaining region, has at least one tab projecting from the main body that includes a detent element, the detent element being configured to engage in one of a plurality of grooves which are formed in a fastening portion of the water-catching strip such that the plurality of grooves are arranged adjacent to each other in a direction of extension of the at least one tab;
wherein the fastening portion of the water-catching strip is retained in the retaining region of the fastening device,
the detent element of the at least one tab engages in one of the plurality of grooves of the water-catching strip, and
a respective length of the groove in which the tab is engaged is greater than a length of an engagement region in which the detent element engages in one of the grooves.

* * * * *